United States Patent
Tokutomi

[15] 3,682,056
[45] Aug. 8, 1972

[54] FLASH CONTROLS FOR CAMERAS
[72] Inventor: Seijiro Tokutomi, Fujisawa, Japan
[73] Assignee: Asahi Kogaku Kogyo Kabushiki Kaisha, Tokyo-to, Japan
[22] Filed: Sept. 8, 1970
[21] Appl. No.: 70,286

[30] Foreign Application Priority Data
 Sept. 18, 1969  Japan.....................44/88896

[52] U.S. Cl............95/10 CE, 95/11.5 R, 315/241 P
[51] Int. Cl.......................G03b 15/05, H05b 41/32
[58] Field of Search......95/10 CE, 11.5 R; 315/241 P

[56] References Cited
UNITED STATES PATENTS

| | | | |
|---|---|---|---|
| 3,122,677 | 2/1964 | Flieder | 315/241 |
| 2,901,671 | 8/1959 | Most | 95/11.5 X |
| 3,465,656 | 9/1969 | Wick et al | 95/11.5 X |

Primary Examiner—Samuel S. Matthews
Assistant Examiner—Michael L. Gellner
Attorney—Steinberg & Blake

[57] ABSTRACT

A system for controlling the extent of flash illumination provided in connection with exposure of film in a camera. A flash tube is energized by way of a discharge from a capacitor, and an electrical control is operatively connected with the capacitor to respond to the discharge thereof. This latter electrical control is conditioned according to a number of exposure-determining factors, including intensity of the light at the object which is photographed and distance between the camera and the object, and when the electrical control reaches a condition corresponding to proper exposure of film in the camera, it automatically triggers a bypass which is operatively connected with the capacitor to bypass the energy thereof so as to terminate the flash illumination.

14 Claims, 1 Drawing Figure

PATENTED AUG 8 1972
3,682,056
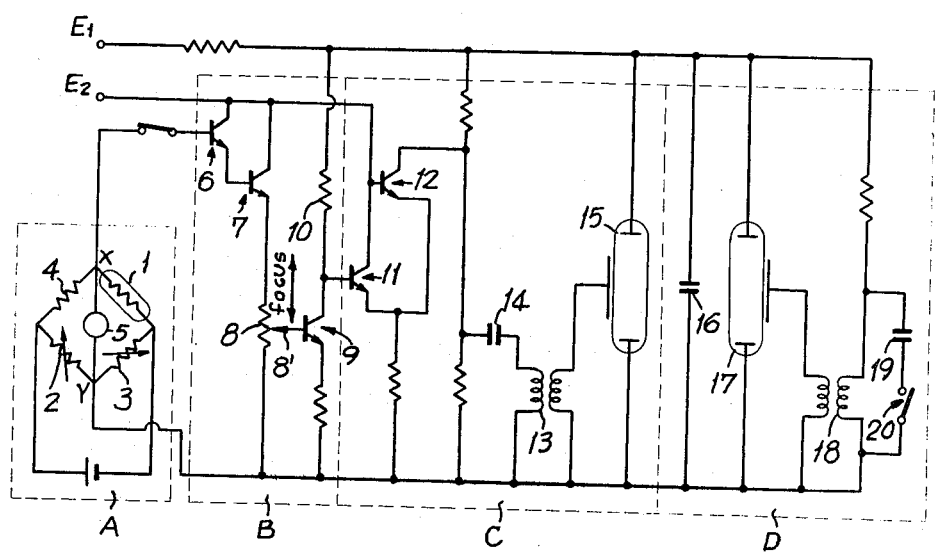
INVENTOR
SEIJIRO TOKUTOMI
BY
Steinberg and Blake
ATTORNEYS

FLASH CONTROLS FOR CAMERAS

BACKGROUND OF THE INVENTION

The present invention relates to cameras.

In particular, the present invention relates to flash-illumination devices for cameras.

As is well known, it is conventional at the present time to equip cameras with flash devices which provide artificial illumination in synchronism with exposure of the film. It is conventional to provide cameras with an exposure-control mechanism for such purposes, and this mechanism will generally require that the diaphragm be adjusted to set the camera to provide a predetermined exposure aperture. Thus, the particular value of the diaphragm setting is calculated based upon such factors as the guide number of the particular flash-illuminating device, the speed of the film which is exposed, and the distance from the camera to the object which is photographed. In addition to these factors, it is also necessary to include variations in the setting depending upon the experience and intuition of the photographer. Thus, while such factors as distance of the camera to the object, the guide number, and film speed will indicate a given setting of the diaphragm, this latter setting may be changed by the operator depending upon the particular conditions under which the exposure is made. Thus if the exposure conditions are such that a great deal of light will be reflected by highly reflecting wall surfaces of a room, for example, the setting will be changed accordingly by an experienced operator, and of course the setting will also be changed under conditions where there is very little reflected light to be expected.

These operations are extremely time consuming and inconvenient since both numerical calculations and the experience of the operator are required. The result is that so much time is required to determine a proper setting that often the chance of taking a photograph is lost since the proper settings cannot be made before the object to be photographed has changed its condition to one where a photograph is no longer desired.

It has already been proposed to avoid drawbacks of this latter type by providing relatively automatic systems for setting the camera to make exposures with flash illumination, but known automatic systems have proved to be of considerably disadvantage since the settings of the diaphragm aperture and the photographic magnification or conditions under which proper exposures can be made with such automatic systems are extremely limited. In order to attempt to reduce these drawbacks with an exposure which is synchronized with the flash illumination, there has been recently a development according to which the extent of illumination with the flash source is automatically controlled by measuring the light reflected from the object and then automatically achieving suitable controls. However, this latter system has proved in practice to be inconvenient because it requires a complex structure including a special integrating mechanism for detecting the amount of flash illumination which is reflected from the object and a special photosensitive structure which has the capability of responding with the extreme rapidity which is required under these conditions.

SUMMARY OF THE INVENTION

It is accordingly a primary object of the present invention to provide an automatic control for flash illumination which will avoid the above drawbacks.

In particular it is an object of the invention to provide an automatic flash control which is of a relatively simple and inexpensive construction capable of eliminating various drawbacks involved at the present time in automatic illumination control where the exposure is synchronized with the flash illumination.

Thus, it is an object of the invention to avoid an automatic control which requires measuring the flash illumination which is reflected from the object.

In addition it is an object of the invention to provide an automatic system which can take into account an extremely wide range of factors which will determined the exposure, including the factors of the setting of the diaphragm and the distance between the camera and the object.

Also, it is an object of the invention to provide a construction of this type which has a built-in exposure-determining mechanism which does not require a special photosensitive element to measure the flash illumination which is reflected from the object.

Furthermore, it is an object of the invention to provide a construction which lends itself to use in a single-lens reflex camera where the light is measured after passing through the lenses of the objective.

According to the invention the camera is provided with a flash means for providing flash illumination, and a capacitor means is operatively connected with the flash means for energizing the latter with the discharge of the capacitor means. A control means is operatively connected with the capacitor means for responding to the discharge thereof, and a conditioning means coacts with the control means for conditioning the latter according to a plurality of exposure-determining factors which include the distance of the camera to the object, the intensity of the light at the object, and of course the exposure time, the exposure aperture, and the film speed. A bypass means is operatively connected with the capacitor means for bypassing the dis-charge thereof so as to terminate energizing of the flash means, and an actuating means is operatively connected on the one hand with the bypass means and on the other hand with the control means for initiating the operation of the bypass means at an instant when the control means assumes a condition corresponding to one where a proper exposure will be provided for the film in the camera.

BRIEF DESCRIPTION OF DRAWING

The invention is illustrated by way of example in the accompanying drawing which is a schematic wiring diagram of a preferred embodiment of the invention.

DESCRIPTION OF A PREFERRED EMBODIMENT

Referring now to the drawing, there is shown at the left thereof a conditioning means for conditioning a control means which is formed by the transistor 9. This conditioning means includes a bridge circuit having the branches 1-4. The branch 1 is formed by a photosensitive means of well known construction which receives light from the object which is to be photographed and which will provide for the branch of the bridge circuit which includes the photosensitive means 1 a resistance corresponding to the light intensity at the object which is to be photographed. The branches 2 and 3 include variable resistors which can be set in a well known manner in accordance with the factors of exposure time, exposure aperture, and film speed. Thus, one of these resistors may be set according to the value of both exposure time and film speed, while the other can be set according to the selected diaphragm setting. The bridge circuit includes a fixed resistor 4 and an ammeter 5 connected between the terminals X and Y. The bridge circuit is fed from a separate source of current, as indicated by the battery at the lower left of the drawing. This part of the conditioning means forms an exposure meter circuit A of a fixed matching type, in that ordinarily such a system will be used by setting one of the variable resistors at a value which will achieve a fixed position for the ammeter.

The output from the terminals X and Y of the bridge circuit is fed through an amplifier of the conditioning means, this amplifier being formed by the transistors 6 and 7. The voltage from the output terminals X and Y of the bridge circuit, after being thus amplified by the transistorized amplifier 6,7, is supplied to and forms the input for a potentiometer 8 of the conditioning means, this potentiometer having its resistor connected in series with the output of the amplifier 6,7. The potentiometer of the conditioning means includes a slider 8' which is movable along the resistor of the potentiometer, and as is indicated by the double-headed arrow this slider 8' can be moved along the resistor of the potentiometer in response to focussing of the camera. Thus when the objective is adjusted in order to focus the camera on the object which is to be photographed, the slider', by its connection with the objective-adjusting structure which adjusts the objective for the distance from the camera to the object, will move in one direction or the other along the resistor of the potentiometer so that the position of the slider 8' is indicative of the distance of the camera to the object.

As is apparent from the drawing, the conditioning means will introduce these exposure-determining factors of distance of the camera to the object, light intensity at the object, exposure aperture, exposure time, and film speed into the base of the transistor which forms the control means 9. A divided voltage is also applied to the base of the transistor 9 through connection with a source of low voltage through the terminal $E_2$ and the resistor of the potentiometer as well as the slider thereof. The collector of the transistor 9 is connected through a collector resistor 10 with a terminal $E_1$ connected to a source of high voltage, so that this assembly of the amplifier 6,7, potentiometer 8, transistor 9, and collector resistor 10 forms a mechanism B for determining the amount of illumination in a manner described in greater detail below.

A transistorized Schmidt trigger circuit is formed by the transistors 11 and 12 connected to the collector of the transistor 9. Thus the Schmidt trigger circuit uses the collector voltage of the transistor 9. This Schmidt trigger 11, 12 forms part of an actuating means for actuating a bypass means 15 in the form of a discharge tube which is energized by the actuating means to create a discharge of relatively low impedance for the capacitor means formed by the main capacitor 16. This actuating means for the bypass means 15 includes also the bypass capacitor 14 and a transformer 13 the primary winding of which is connected in series with the capacitor 14. As is apparent from the drawing, the series-connected bypass capacitor 14 and primary winding of the transformer 13 are connected between the collector and emitter of the transistor 9, specifically through the second transistor 12 of the Schmidt trigger.

The discharge tube 15 which forms the bypass means is connected in parallel with the capacitor means 16 which forms the main discharge capacitor. Thus, the bypass means 15 with the actuator means formed by the components 11–14 form a unit C for controlling the extent of flash illumination. The high voltage secondary winding of the transformer 13 is connected in a known way to an electrode capable of initiating the operation of the discharge 15.

The flash illuminating mechanism D includes the capacitor means 16 as well as the flash means which is formed by the flash discharge tube 17. An electrode which initiates the operation of the flash discharge tube 17 is connected with the secondary of the trigger transformer 18, the primary winding of this transformer being connected to a trigger capacitor 19 through the synchronizing switch 20 which is closed simultaneously with actuation of the camera shutter, in a known way.

The structure described above operates in the following manner:

The exposure meter mechanism A is built into and forms part of the camera. This mechanism is arranged in such a way that the voltage across the output terminals X and Y of the bridge circuit, which depends upon the resistance value of the photosensitive means 1, the resistance which is determined by the intensity of the light at the object which is to be photographed, as well as upon the settings of the variable resistors 2 and 3, in accordance with the settings of exposure time, exposure aperture, and film speed, provides through the ammeter 5 a given reading which upon having a given value will provide a proper exposure in accordance with the settings of the variable resistors 2 and 3.

Under conditions, however, where flash illumination is required, the exposure time is set at a predetermined shutter speed required for proper synchronization with the flash illumination. For example, when utilizing flash illumination in connection with exposing film in the camera, the exposure time is set at 1/45 sec., the diaphragm aperture is also set at this time at a given value so that the voltage in accordance with the settings of the resistors 2 and 3 and in accordance with the photosensitive means 1 develops a given voltage across the output terminals X and Y, prior to energizing of the flash means 17. Of course, in the case where flash illumination is required the ammeter 5 will have a value other than the fixed, predetermined value at which a proper exposure will be achieved. Under these conditions, the value of the ammeter 5 will be one which indicates that there is insufficient light available for a proper exposure, thus indicating that flash illumination is required.

The voltage across the output terminals X and Y is amplified through the amplifier 6, 7 and thereafter influences the potentiometer 8. After this potentiometer has been adjusted in accordance with the distance from the camera to the subject, all of these various exposure-determining factors provide the information which determines the condition of the control means formed by the transistor 9 with these items of information being applied to the base of the transistor 9, as pointed out above.

Upon closing of the switch 20, in response to tripping of the shutter to make an exposure, the discharge from the trigger capacitor 19 will act through the trigger transformer 18 on the electrode connected to the secondary thereof for energizing the flash means 17 which will now be energized with the discharge from the capacitor means 16. Thus the capacitor means 16, which with the other capacitors has been fully charged prior to operation, as is well known, will begin to discharge through the flash tube 17, and the terminal voltage of the main capacitor 16 will gradually drop. The control means formed by the transistor 9 is operatively connected with the terminals of the capacitor 16 so as to respond to the discharge thereof. Thus the gradual voltage drop during discharge of the capacitor 16 is introduced into the transistor 9 through the connection of the collector and emitter thereof with the terminals of the capacitor 16. The connection of the discharge of capacitor means 16 across the emitter and collector of the transistor 9 and the conditioning of the latter by the information introduced to the base of the transistor will thus provide a variation in the condition of the transistor 9 as the voltage at the capacitor 16 gradually drops during discharge through the flash tube 17 while the latter provides flash illumination.

The Schmidt trigger of the actuating means has the collector voltage of the transistor 9 applied to the base of the transistor 11 of the Schmidt trigger, and there will be automatic reversal at the Schmidt trigger when the voltage from the capacitor 16 drops to a value which with the information supplied to the base of the transistor 9 provides the latter with a condition corresponding to that at which a proper exposure will be achieved for the film which is the camera. In other words, during the drop in voltage of the discharge from the capacitor 16, the transistor 11 will transfer to a non-conductive state while the transistor 12 will assume a conductive state, so that the trigger capacitor 14 will now discharge through the primary of the transformer 13 so as to energize the bypass means 15. Thus, at this moment the capacitor 14 can discharge through the transistor 12 and the higher trigger voltage is provided on the secondary winding of the trigger transformer 13 with the result that the latter acts on the electrode of the bypass discharge tube 15 to energize the latter. Because the bypass means 15 has an impedance substantially less than that of the flash tube 17, the main capacitor 16 will now discharge through the bypass means 15 and the energizing of the flash means 17 will terminate.

Thus, with the structure described above and illustrated in the drawing, there will be an automatic determination of the extent to which the flash means 17 is energized, to achieve a proper exposure in accordance with a number of exposure-determining factors which include the distance of the camera to the object, as controlled through the mechanism B, and with the bypass means 15 being actuated with the mechanism C, so that the extent of illumination from the flash means 17 will provide a proper exposure for the particular photographing conditions.

Thus, with the structure of the invention prior to actual exposure, information such as the intensity of the light at the object, as determined through mechanism A, with additional factors such as the size of the exposure aperture, the exposure time, and the film speed, in addition to the distance of the camera to the object, all provide information which together with the detection of the terminal voltage of the capacitor means 16 during illumination from the flash means 17 will achieve the proper extent of illumination in a fully automatic manner as determined by the control means 9 with the transistors 11 and 12 bringing about initiation of the operation of the bypass means 15 at the proper instant. It is apparent, therefore, that with the structure of the invention it is completely unnecessary to carry out any measurement of reflection of the flash illumination from the object which is photographed. Thus the special photosensitive device which would be required to measure the flash illumination from the flash tube 17 reflected from the object during actual exposure is completely unnecessary. In addition through the above simple expedient it becomes possible to bring about an automatic control in accordance with the distance between the camera and the object. Thus the structure of the invention solves in an exceedingly simple manner several problems inherent in the conventional devices, with these simplifications of the invention being brought about not only in the structure which must be manufactured and assembled but also in the operation of the structure.

It is particularly to be noted that the mechanism of the invention for temporarily storing the information such as the setting of the diaphragm aperture and the distance of the camera to the object lends itself to use in a single-lens reflex camera having a through-the-lens light-measuring system so that the light which is measured has initially passed through the lenses of the objective. In addition, the mechanism of the invention will automatically bring about control of the illumination in full automatic synchronism with the exposure of the film on the basis of the information which takes the form of the various exposure-determining factors referred to above, whenever the available natural light or light other than the flash illumination is insufficient for a proper exposure.

What is claimed is:

1. For use with a camera, flash means for creating flash illumination, capacitor means operatively connected with said flash means for energizing the latter during discharge of said capacitor means, control means operatively connected with said capacitor means for continuously responding to said capacitor means during discharge thereof while said flash means is energized by said capacitor means, conditioning means operatively connected with said control means for conditioning the latter according to a plurality of exposure-determining factors, bypass means operatively connected with said capacitor means for bypassing the discharge thereof to terminate energizing of said flash means when said bypass means becomes operative, and actuating means operatively connected with said bypass means and with said control means for rendering said bypass means operative when said control means, in response to the combination of the extent of discharge of said capacitor means and the conditioning according to the exposure-determining factors, reaches a condition corresponding to proper exposure of film in the camera.

2. The combination of claim 1 and wherein said conditioning means conditions said control means according to a plurality of exposure-determining factors which include the factor of distance from the camera to the object which is photographed.

3. The combination of claim 2 and wherein said conditioning means includes a potentiometer having a resistor and a slider movable therealong to a location determined by the distance of the camera to the object.

4. The combination of claim 1 and wherein said conditioning means conditions said control means according to a plurality of exposure-determining factors which include the factor of light intensity at the object which is photographed.

5. The combination of claim 4 and wherein said exposure-determining factors also include the factors of distance from the camera to the object, exposure time, exposure aperture, and film speed.

6. The combination of claim 4 and wherein said conditioning means automatically conditions said control means according to the factor of light intensity at the object which is photographed.

7. The combination of claim 1 and wherein said conditioning means includes a meter for indicating whether or not illumination with said flash means is required.

8. The combination of claim 7 and wherein said conditioning means includes in addition to said meter a plurality of means for setting the camera to make a proper exposure without operation of said flash means.

9. For use with a camera, flash means for creating flash illumination, capacitor means operatively connected with said flash means for energizing the latter during discharge of said capacitor means, control means operatively connected with said capacitor means for responding to the discharge thereof, conditioning means operatively connected with said control means for conditioning the latter according to a plurality of exposure-determining factors, bypass means operatively connected with said capacitor means for bypassing the discharge thereof to terminate energizing of said flash means when said bypass means becomes operative, and actuating means operatively connected with said bypass means and with said control means for rendering said bypass means operative when the control means, in response to the combination of the discharge of said capacitor means and the conditioning according to the exposure-determining factors, reaches a condition corresponding to proper exposure of film in the camera, said conditioning means conditioning said control means according to a plurality of exposure-determining factors which include the factor of light intensity at the object which is photographed, said exposure-determining factors also including the factors of distance from the camera to the object, exposure time, exposure aperture, and film speed, said conditioning means including a bridge circuit having a plurality of branches some of which include variable resistors set according to some of said factors and one branch of which includes a photosensitive means for responding to the light intensity at the object.

10. For use with a camera, flash means for creating flash illumination, capacitor means operatively connected with said flash means for energizing the latter during discharge of said capacitor means, control means operatively connected with said capacitor means for responding to the discharge thereof, conditioning means operatively connected with said control means for conditioning the latter according to a plurality of exposure-determining factors, bypass means operatively connected with said capacitor means for bypassing the discharge thereof to terminate energizing of said flash means when said bypass means becomes operative, and actuating means operatively connected with said bypass means and with said control means for rendering said bypass means operative when the control means, in response to the combination of the discharge of said capacitor means and the conditioning according to the exposure-determining factors, reaches a condition corresponding to proper exposure of film in the camera, said conditioning means conditioning said control means according to factors which include exposure time, exposure aperture, film speed, light intensity at the object which is photographed, and distance of the camera to the object, said conditioning means having a bridge circuit branches of which are formed by variable resistors for introducing factors other than the distance of the camera to the object, one of said branches including a photosensitive means for responding to light intensity, and said conditioning means including a potentiometer having a resistor operatively connected with said bridge circuit to be influenced thereby, said potentiometer having a slider movable along said resistor of said potentiometer to a location determined by the distance of the camera to the object, and said control means including a transistor having a base electrically connected with said slider so that all of the exposure-determining factors are introduced into the base of said transistor, said transistor having a collector and emitter operatively connected with said capacitor means for responding to the discharge thereof, and said actuating means being operatively connected with said transistor to be operated thereby for actuating said bypass means.

11. The combination of claim 10 and wherein said actuating means is operatively connected to the collector of said transistor.

12. The combination of claim 11 and wherein said actuating means includes a Schmidt trigger and a bypass capacitor the discharge of which is initiated by said Schmidt trigger when said transistor reaches a condition corresponding to proper exposure of film in the camera, said bypass means being operatively connected with said bypass capacitor for responding to discharge thereof to initiate the bypass of energy from said capacitor means.

13. The combination of claim 12 and wherein an amplifier mans forms part of said conditioning means and is interposed between said bridge circuit and said resistor of said potentiometer.

14. The combination of claim 13 and wherein said amplifier means and said Schmidt trigger are both transistorized.

* * * * *